OPEN LEG ANNULLER

Filed Oct. 24, 1963 2 Sheets-Sheet 1

INVENTORS
JAMES T. NEISWINTER
CARL N. PEDERSON
BY Hofgren, Wegner,
Allen, Stellman & McCord
Attys.

July 18, 1967 J. T. NEISWINTER ETAL 3,331,922

OPEN LEG ANNULLER

Filed Oct. 24, 1963 2 Sheets-Sheet 2

United States Patent Office 3,331,922
Patented July 18, 1967

3,331,922
OPEN LEG ANNULLER
James T. Neiswinter, Garden City, N.Y., and Carl N. Pederson, Westmont, Ill., assignors to Pioneer Electric and Research Corporation, a corporation of Illinois
Filed Oct. 24, 1963, Ser. No. 318,673
2 Claims. (Cl. 178—69)

ABSTRACT OF THE DISCLOSURE

An open circuit condition on a receive leg of a telegraph network is detected and, if it persists longer than a preset time interval, results in that leg being disconnected from its associated receive hub. This prevents the "open" from disturbing transmission over the other receive legs connected in common to the hub. An alarm signal is also generated. The disconnect and alarm may be reset either automatically or manually, upon cessation of the "open" condition.

The present invention relates to a telegraph receive leg disconnect device and more particularly to a device for disconnecting a telegraph receive leg from a telegraph receive hub when an "open" circuit condition occurs on a receive leg for a preselected period of time.

In the operation of telegraph legs composed of a receive leg and a send leg, the receive leg of the telegraph leg is connected to a common receive hub and the send leg of each telegraph leg is connected to a common send hub. If no regeneration is provided, the receive hub is connected directly to the send hub. If the regeneration is provided, the receive hub connects to the send hub through a one-way regenerative repeater so that signals incoming on any receive leg pass through the repeater and are regenerated before going out on the send legs. With either the direct connection or the connection through the regenerative repeater from the receive hub to the send hub, signals incoming from a receive leg are passed through all send legs.

Whenever a receive leg becomes "open," it continuously "spaces." Therefore, in the past, if a receive leg did become "open," not only that leg, but all legs connected to a receive hub would be useless because, even if the other receive legs transmitted "marks," they would not be able to override the "space" produced by the defective "open" receive leg. Long, many-sectioned backbone telegraph circuits, which span the country with side legs at many intermediate points, have often been paralyzed by a single "open" condition occurring on any one of the many side legs. The present invention overcomes this difficulty by providing a device which can be connected between a receive leg and a receive hub to disconnect the receive leg from the hub whenever the leg becomes "open" for a predetermined time period. Thus, by use of the present invention, any side leg that becomes "open" is automatically removed from the backbone circuit in a predetermined period, and service to all other points can be resumed.

Therefore, it is an object of the present invention to provide a new and improved telegraph circuit.

A further object is to provide a device which can be inserted between a receive leg of a telegraph leg and a receive hub which will disconnect the receive leg from the hub when the receive leg becomes "open."

Figure 1:
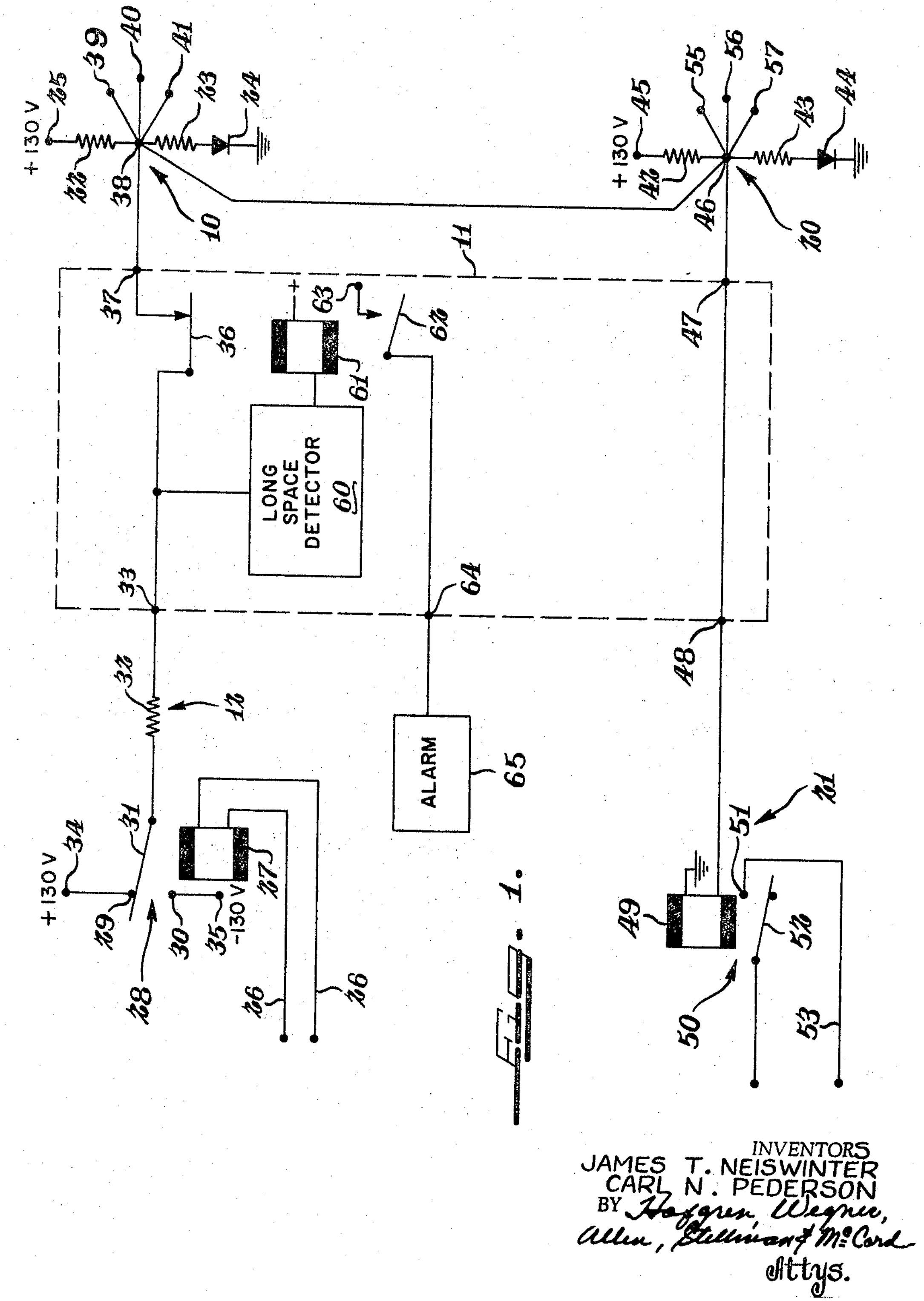
Figure 2:
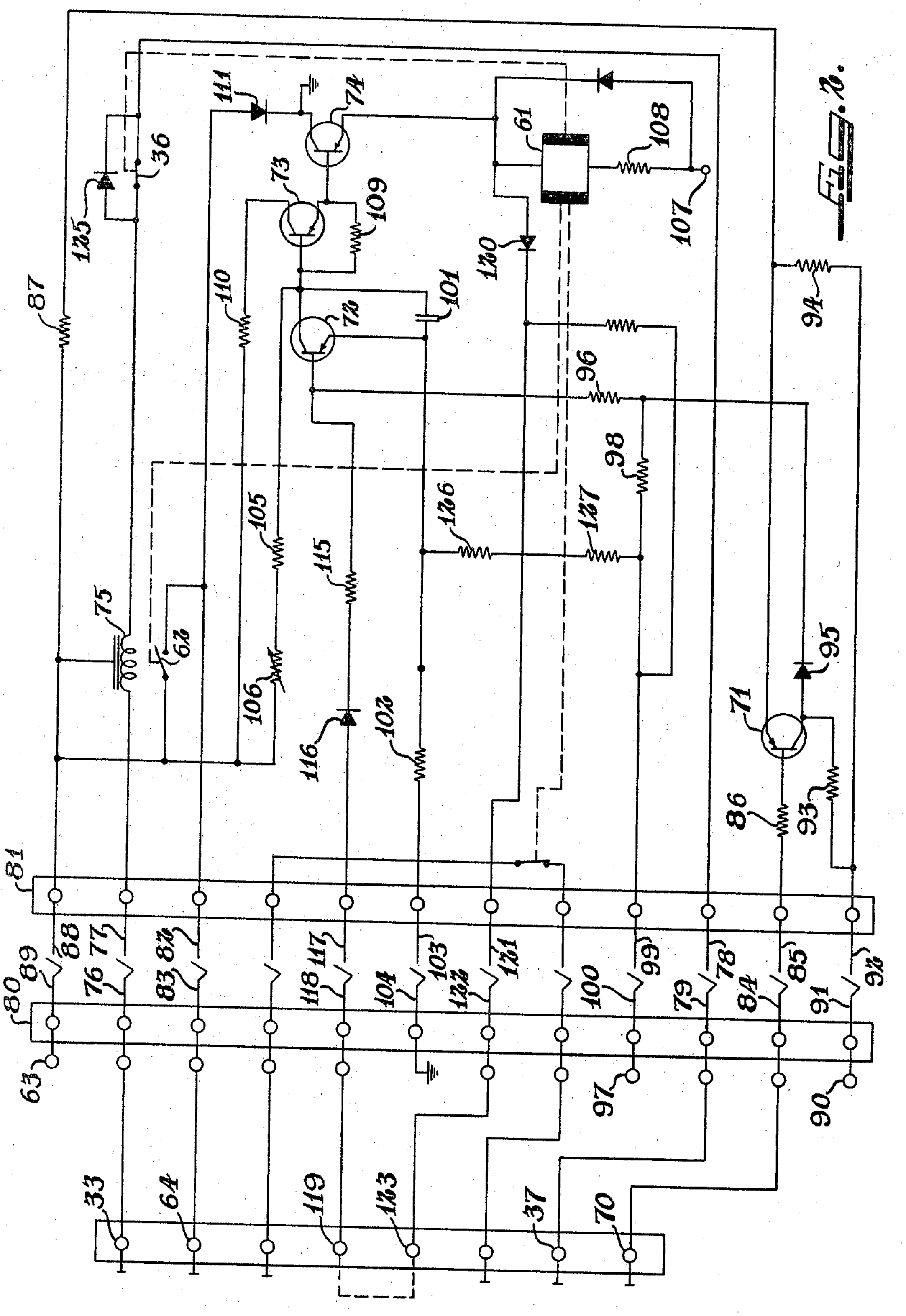

Another object is to provide a device which can detect the presence of an "open" condition on a telegraph receive leg and actuate an alarm to call attention to the "open" circuit condition of a receive leg. Further objects and advantages will become apparent from the following detailed description taken in connection with the accompanying drawings in which:

FIGURE 1 is a diagram of an embodiment of the present invention inserted into a telegraph circuit; and FIGURE 2 is a detailed schematic diagram of the embodiment of the invention shown in FIGURE 1.

While this invention is susceptible of embodiment in many different forms, there is shown in the drawings and will herein be described in detail, an embodiment of the invention with the understanding that the present disclosure is to be considered as an exemplification of the principles of the invention and is not intended to limit the invention to the embodiment illustrated. The scope of the invention will be pointed out in the appended claims.

Referring first to FIGURE 1, a telegraph receive hub generally indicated at 10 is connected through an open leg annuller 11 to a telegraph receive leg generally indicated at 12, and a send hub generally indicated at 20 is connected to a send leg generally indicated at 21. The receive hub 10 consists of a 5,000 ohm resistor 22, a 4,000 ohm resistor 23, and a rectifier 24 connected between a terminal 25, which is connected to a positive 130 volt direct current source (not shown) and ground. The receive leg 12 includes the receive lines 26 which terminate in a relay coil 27 of a relay 28 having fixed contacts 29 and 30 and a movable contact 31 and a 3,000 ohm resistor 32 connected in series with the movable contact 31 and a terminal 33 on the open leg annuller 11. The fixed contact 29 is connected to a terminal 34 which is connected to a positive 130 volt direct current source (not shown) and the fixed contact 30 is connected to a terminal 35 which is connected to a negative 130 volt direct current source (not shown). The terminal 33 is connected through a pair of relay contacts 36 to a terminal 37 which, in turn, is connected to a terminal 38 at the junctions of resistors 22 and 23 one receive hub 10. When the relay 28 is de-energized, movable contact 31 is closed on fixed contact 29 and the resistor networks of resistors 22, 23 and 32 provide a positive 60 volts at terminal 38. Additional receive legs, represented by the terminals 37, 38 and 39, are connected to the terminal 38. As long as the relays in these receive legs are de-energized, a positive 60 volts will appear at the terminal 38 of the receive hub 10. A positive 60 volts on a telegraph hub is the "marking" condition of the hub. Whenever a "space" is transmitted on the receive leg 12, the relay 28 is energized disconnecting the movable contact 31 from the fixed contact 29 and connecting it to the fixed contact 30 which connects the resistor 32 to a negative 130 volt direct current source. This action causes the voltage on terminal 38 to drop to a negative 30 volts which is the "spacing" condition for a receive hub. Whenever one of the receive legs originates a message, it will cause the hub 10 to commence "spacing."

The send hub 20 includes a 5,000 ohm resistor 42, a 4,000 ohm resistor 43, and a rectifier 44 serially connected between a terminal 45 which is connected to the 130 volt direct current source. A terminal 46 at the junction of resistors 42 and 43 is connected directly to terminal 38 of the receive hub 10. If a regenerative repeater is to be utilized between the receive and send hubs, it is serially connected to the terminals 38 and 46 so that the "marks" and "spaces" appearing at terminals 38 are reproduced at terminal 46. Terminal 46 is connected to ground, through terminals 47 and 48 of open leg annuller 11 and a relay coil 49 of a send relay 50. Send relay 50 has a fixed contact 51 and a movable contact 52 which are serially connected in the send line 53. Additional send legs, which are represented by the terminals 55, 56, and 57, are connected to terminal 46 and are identical to send leg 21. Thus, when a signal originates on any one of the receive legs connected to receive hub 10, that signal is transmitted via send hub 20 to all the send legs 21, 55, 56 and 57. If the open leg annuller 11 were not inserted between the receive leg 12 and receive hub 10, any "open" circuit condition on receive leg 12 would cause that leg to continuously "space" and therefore, force the receive hub 10 to continously "space." Thus, not only the defective leg would be non-operational, but it would prevent any of the other legs 39–41 from transmitting a message to receive hub 10 and onto send hub 20 and the send legs connected thereto. However, with the open leg annuller inserted in the telegraph circuit as shown in FIGURE 1, a long space detector 60 is connected through the terminal 33 to receive leg 12 so that it can detect continuous "spacings" on leg 12 that exceeds a predetermined period, preferably three seconds. The long space detector 60 is connected to a relay coil 61 which operates the relay contacts 36 and a pair of relay contacts 62. When "spacing" on leg 12, and therefore at terminal 35, has exceeded a predetermined period, the long space detector 60 energizes coil 61 opening the contacts 36 to disconnect the defective leg from the receive hub 10 and closing contacts 62 which are connected to a terminal 63, which is connected to a negative 24 volt direct current source (not shown), and to an output alarm terminal 64. The alarm terminal 64 is connected to an alarm which may be of any visual or audio type well known in the art in order to actuate it whenever the contacts 62 close to provide a negative 24 volts. Such actuation of the alarm 65 calls attention to the open circuit condition on receive leg 12.

Referring now to FIGURE 2, the open leg annuller 11 will be described in greater detail. A terminal 70 is bridged via a semi-high resistance lead (not shown) to the receive leg 12. This lead is used to operate a "hit" lamp. When the receive hub 10 is "marking," the voltage on terminal 70 is such that the lamp is extinguished. When the hub 10 is "spacing," the voltage is such that the lamp lights to indicate to a test board attendant the "spacing" condition of the receive hub 10. When the receive leg is "marking," the voltage on terminal 70 is about −40 volts. When the receive leg 12 is "spacing" the voltage is approximately −110 volts. The long space detector 60 is composed of primarily four transistors 71–74 and their associated circuits. The contacts 36 are serially connected between terminals 33 and 37 with an inductance 75 to two pairs of cooperating connector pins 76–77, and 78-79 mounted on the respective cooperating connectors 80 and 81. The relay contacts 62 are connected to terminal 63, as illustrated in FIGURE 1, and to terminal 64 through a pair of cooperating connector pins 82 and 83.

The terminal 70 is connected to the base of transistor 71 through a pair of cooperating pins 84 and 85 and a 270,000 ohm resistor 86. The emitter of transistor 71 is connected via a 5,100 ohm resistor 87 and a pair of cooperating pins 88 and 89 to terminal 63, and its collector is connected to a negative 130 volt direct current source (not shown) via a terminal 90, a pair of cooperating connecting pins 91 and 92, and a 27,000 ohm resistor 93. An 8,200 ohm resistor 94 is connected across the emitter and collector of transistor 71 and the collector is connected through a zener diode 95 and a 10,000 ohm resistor 96 to the base of transistor 72. The collector of transistor 71 is also connected to a terminal 97 which is connected to a positive 130 volt direct current source (not shown) via a 270,000 ohm resistor 98 and a pair of cooperating connecting pins 99 and 100. The emitter of transistor 71 is at a voltage of −65 volts. When the receive leg 12 is "marking"; transistor 71 will be non-conducting and when the receive leg 12 is "spacing," transistor 71 will conduct. When transistor 71 is non-conducting, transistor 72 will conduct and when transistor 71 conducts, transistor 72 will be non-conducting. A 47 micro-farad condenser 101 is connected across the collector and emitter of transistor 72. The emitter and one side of condenser 101 are connected through a 1,500 ohm resistor 102 and a pair of cooperating connector pins 103 and 104 to ground and through a pair of serially connected 5,600 ohm resistors 126 and 127 and pins 99 and 100 to terminal 97 which, as aforementioned, has a positive 130 volts placed thereon. The emitter of transistor 72 on the other side of condenser 101 is connected through a fixed 47,000 ohm resistor 105 and a 200,000 ohm variable resistor 106, pins 88 and 89 to terminal 63 which is at a negative 24 volts. With this voltage divider arrangement, the capacitor 101 is normally at a positive 15 volts when transistor 72 is in a conducting condition because of a "mark" being present on the receive leg 12. When the receive leg commences to "space," transistor 72 becomes non-conducting and capacitor 101 starts to charge through resistors 105 and 106. When the voltage on capacitor 101 is at any positive value between zero and +15 volts, transistors 73 and 74 are non-conducting and the relay coil 61 which is connected between the emitter of transistor 74 and a terminal 107 with a 270 ohm resistor 108. The terminal 107 is connected to a negative 24 volt direct current source (not shown).

The transistor 73 has a 10,000 ohm resistor 109 connected between its emitter and base, and its collector is connected to pin 88 via a 10,000 ohm resistor 110. The collector of transistor 74 is connected to ground and to terminal 64 through a rectifier 111 and cooperating connecting pins 82–83. With the spacing of normal Teletype signals on receive leg 12, capacitor 101 starts to charge from +15 volts toward −24 volts on each "space" pulse of the signals. In such normal Teletype signals there is no space long enough to allow capacitor 101 to charge from the +15 volts to a negative voltage. Thus, transistors 73 and 74 will remain non-conducting during the origination of normal Teletype signals on receive leg 12.

When a "space" condition persists on the receive leg 12 for three or more seconds, the capacitor 101 charges from +15 volts to a negative voltage which is sufficient to make transistors 73 and 74 conduct and to energize the relay coil 61. The coil 61 opens contacts 36 to separate the receive leg 12 from the receive hub 10. This allows normal service to be resumed on the telegraph circuit to all points except those on the leg which has been cut. The energization of relay coil 61 also closes contacts 62 which connects the −24 volts to terminal 64 which is, in turn, connected to the external alarm 65, in order to energize the alarm.

The base of transistor 72 is connected through a 4,700 ohm resistor 115, a rectifier 116, and a pair of cooperating connecting pins 117–118, to a terminal 119. The relay coil 61 is connected through a zener diode 120, and a pair of cooperating connecting pins 121–122 to a terminal 123. If a strap is placed so as to connect terminals 119 and 123, as indicated by the dashed line, the relay coil 61 will continue to be energized until manually released. For the "marking" condition of the receive leg 12 with transistor 74 non-conducting, the voltage at its collector is −24 volts and the voltage at the left side of the zener diode 120 is a positive 6 volts. The +6 volts is applied through diode 116 and resistor 115 to the base of transistor 72, but this voltage is too small to have any effect on the operation of transistor 72. When transistor 74 becomes conducting to energize relay coil 61, the voltage at its collector will be about zero and the voltage on the left side of the zener diode 120 will be at about +30 volts. This voltage applied through the rectifier 116 and resistor 115 will be sufficient to hold transistor 72 non-conducting even when the receive leg 12 starts to "mark" again. Therefore, the relay coil 61 will remain energized until a button switch (not shown) is pushed momentarily to ground terminals 119 and 123. The resulting low voltage cannot hold transistor 72 in the non-conducting state, and if the receive leg is "marking," the transistor 72 will conduct and cause transistor 74 to become non-conducting and to de-energize relay coil 61.

If the strap between terminals 119 and 123 is not used, the change of the receive leg 12 from "spacing" back to "marking" will cause transistor 74 to become non-conducting and de-energize relay coil 61. Thus, the resetting of the annuller 11 can be accomplished either automatically following the repair of leg 12 or upon the operation of a manually operated switch.

The inductance 75 provides the necessary intervening impedance to prevent welding of the contacts 36. When the relay coil 61 is energized, the voltage on the receive hub 10 may be a positive 60 volts and the voltage from the receive leg may be negative 130 volts. If a space is being received, and relay coil 61 is energized, the closing of the contacts 36 will not connect, without an intervening impedance, an orifice cable charged capacitively to negative 110 volts to another office cable charged capacitively to positive 60 volts without causing a momentary high surge of current which could weld close the contacts 36.

A diode 125 is connected in parallel with the contacts 36 to allow a −30 volt condition on the receive hub 10 caused by a "space" being sent to the hub by either legs 39, 40 or 41 to bypass the contacts and to reach a coupling unit (not shown) associated with the receive leg. This feature is necessary with only the type of coupling unit which has a flip-flop circuit in it that controls the passage of signals on the send leg. The diode 125 is therefore unnecessary for the normal functioning of the open leg annuller 11.

We claim:

1. A Teletype control circuit for insertion between a receive leg of a Teletype leg and a receive hub comprising:

switch contacts for disconnecting a receive leg from a receive hub, a rectifier connected across said switch contacts, a pair of terminals of which one is adapted to be connected to a receive leg and the other is adapted to be connected to a receive hub, said switch contacts and said rectifier being connected in parallel between said terminals, a first transistor having a base adapted to be bridged to a receive leg, a collector, and an emitter adapted to be connected to a direct current source;

a second transistor having a base connected to the first transistor collector, a collector and an emitter;

a condenser adapted to be connected across a direct current source and connected across said emitter and collector of said second transistor;

a third transistor having a base connected to said second transistor collector, a collector adapted to be connected to a direct current source, and an emitter;

a relay coil controlling said switch contacts; and a fourth transistor having a base connected to said third transistor emitter, a collector and an emitter, said collector and emitter adapted to be connected in series with said relay coil across a direct current source.

2. In combination with the control circuit specified in claim 1, a zener diode connected between said second transistor base and said fourth transistor emitter.

References Cited

UNITED STATES PATENTS

| | | | |
|---|---|---|---|
| 2,069,251 | 2/1937 | Kinkead | 178—69 |
| 2,275,126 | 3/1942 | Bonorden | 178—69 |
| 2,332,451 | 10/1943 | Marshall | 178—69 |
| 2,350,180 | 5/1944 | Miller | 178—69 |
| 3,288,929 | 11/1966 | Hutchinson | 178—69 |

NEIL C. READ, *Primary Examiner.*

THOMAS A. ROBINSON, *Examiner.*

UNITED STATES PATENT OFFICE

CERTIFICATE OF CORRECTION

Patent No. 3,331,922 July 18, 1967

James T. Neiswinter et al.

It is hereby certified that error appears in the above numbered patent requiring correction and that the said Letters Patent should read as corrected below.

Column 4, lines 29, 32 and 36, and column 5, lines 32 and 33, for "Teletype", each occurrence, read -- telegraph --.

Signed and sealed this 2nd day of July 1968.

(SEAL)
Attest:

Edward M. Fletcher, Jr.
Attesting Officer

EDWARD J. BRENNER
Commissioner of Patents